March 25, 1947.  D. PARRETT  2,418,048
BRAKE CONTROL
Filed Sept. 8, 1944  3 Sheets-Sheet 1
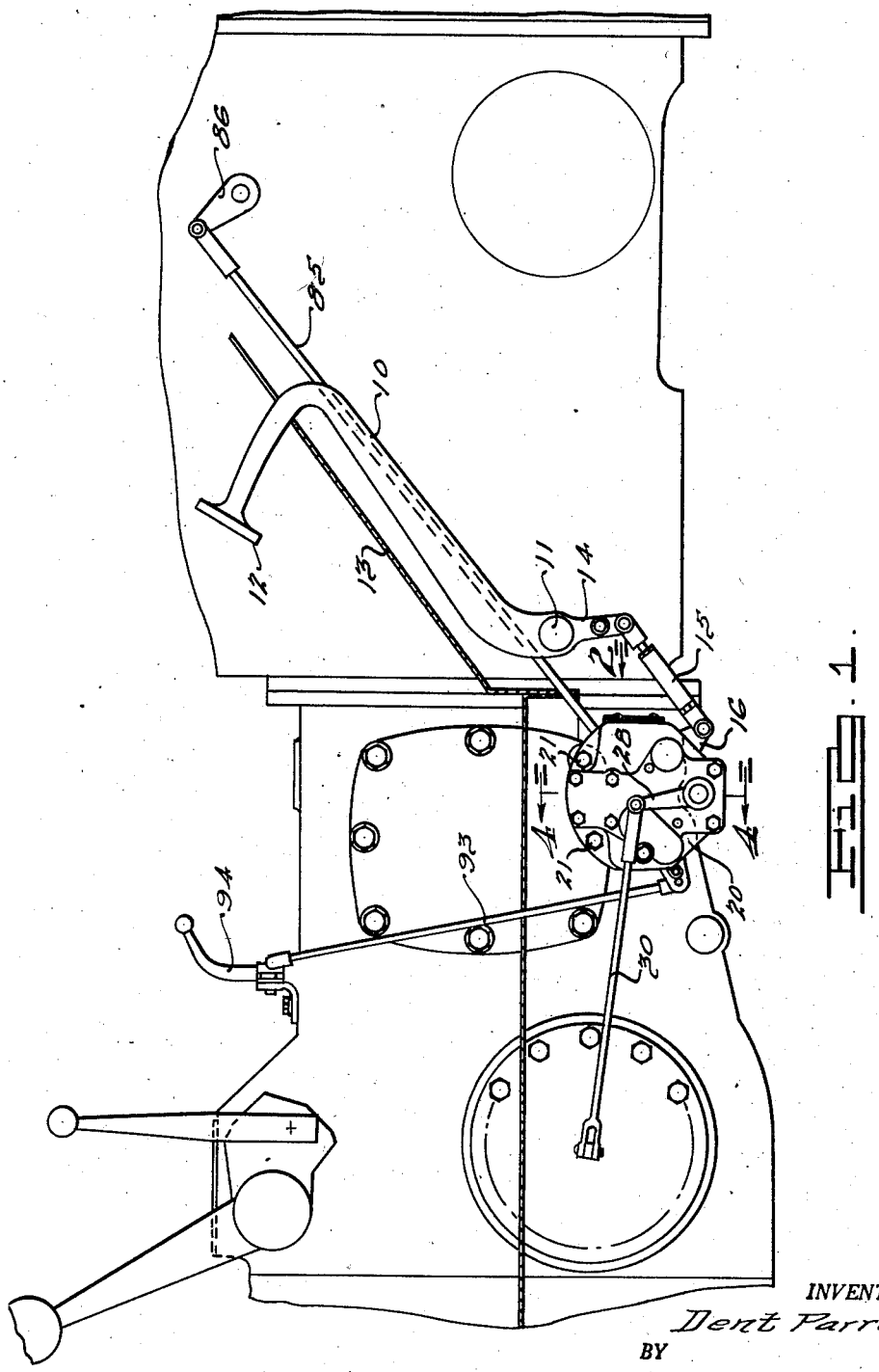
INVENTOR.
Dent Parrett.
BY
Harness, Dickey & Pierce
ATTORNEYS.

March 25, 1947.　　D. PARRETT　　2,418,048
BRAKE CONTROL
Filed Sept. 8, 1944　　3 Sheets-Sheet 2
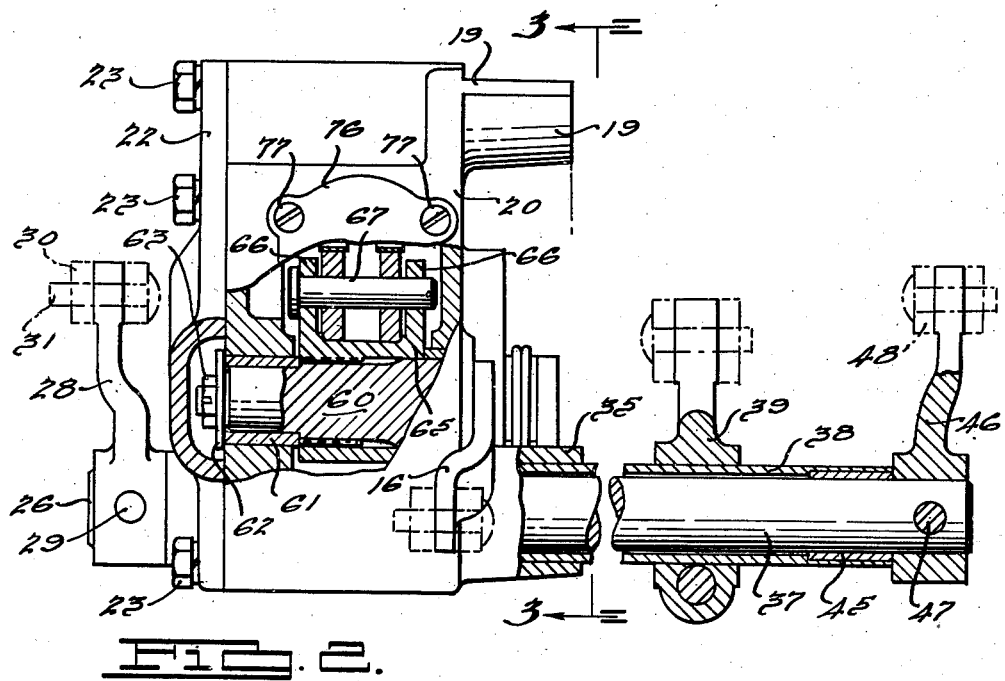
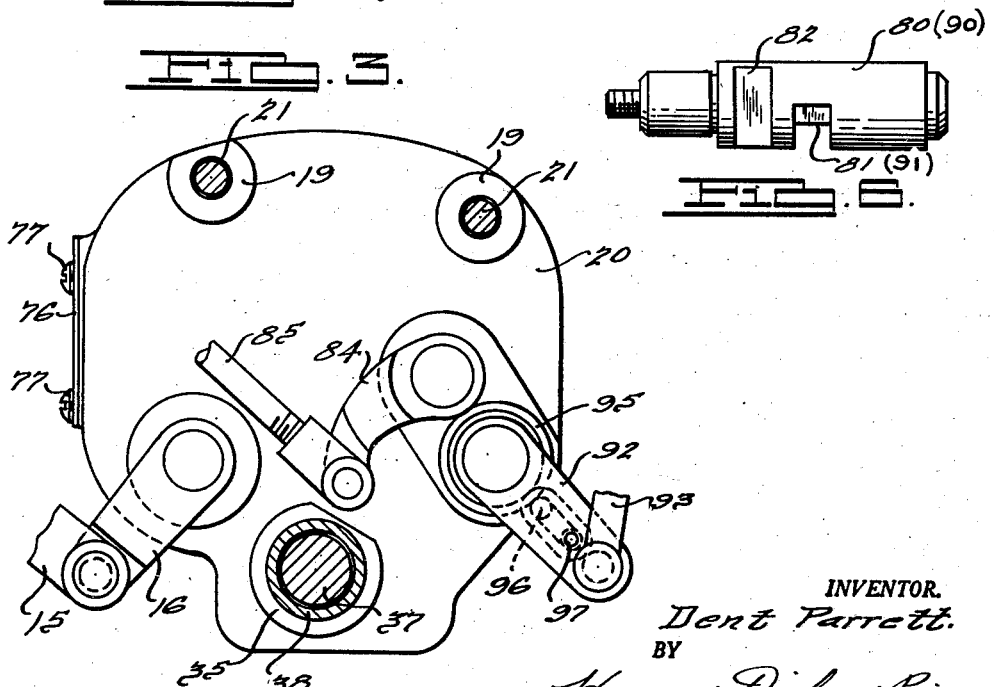
INVENTOR.
Dent Parrett.
BY
Harness, Dickey & Pierce,
ATTORNEYS.

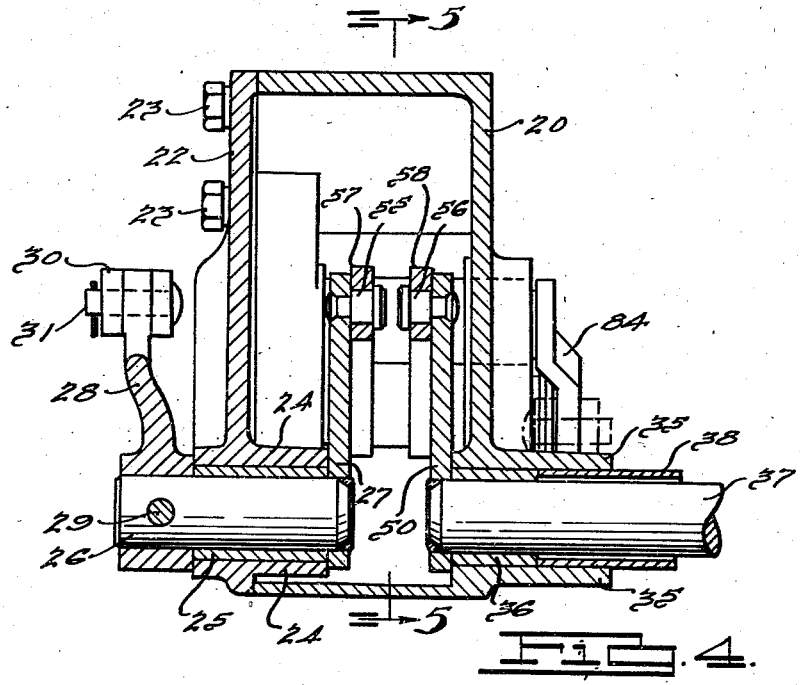

Patented Mar. 25, 1947

2,418,048

UNITED STATES PATENT OFFICE 2,418,048

BRAKE CONTROL

Dent Parrett, St. Joseph, Mich., assignor, by mesne assignments, to The Lambert Brake Corporation, St. Joseph, Mich., a corporation of Michigan Application September 8, 1944, Serial No. 553,171

4 Claims. (Cl. 180—18)

This invention relates generally to braking systems for automotive vehicles. More particularly, it relates to a braking system especially designed for farm tractors or similar types of vehicles in which the braking system, in part at least, is used to aid in steering the vehicle.

Broadly speaking, the present invention has for an object the provision of improved means for coordinating the steering and braking mechanisms of vehicles of this general character in order that the braking mechanism will be of maximum aid and efficiency in steering the vehicle.

Still further, the invention has for a general object the provision of interconnecting means between the steering and braking mechanisms which will serve to perform varying functions under varying needs and conditions of operation.

The invention is particularly designed and intended for use in connection with that type of vehicle which has a pair of relatively large driving wheels, usually the rear wheels, and a pair of such smaller, more closely spaced, non-driven front wheels used for steering. In braking systems suitable for use in vehicles of this type, it is important that under certain conditions braking force exerted by a single pedal be applied simultaneously and uniformly to both rear wheels. This is necessary to provide safe control on highways, going down hills, and when it is desired to hold the tractor in a stationary position, such, for example, as when it is used for belt work.

In certain phases of work, such as in the cultivation of row crops, it is important that very sharp turns be made. It is conventional at the present time to accomplish this by the use of separate pedals for each of the rear wheels thus permitting them to be braked selectively.

It is an important object of the present invention to accomplish these desirable results efficiently and effectively by the use of a single pedal with automatic means for controlling the application of the braking force selectively to either one or both of the driving wheels as may be desired.

Still further occasions may arise, such for example as when one of the driving wheels has poor traction, when it is desirable to selectively brake one or the other of the driving wheels when the question of steering is not involved.

It is, therefore, the main object of the present invention to provide a simple, effective braking and steering construction which will operate efficiently under all of the above described operating conditions.

Many other and further objects, advantages, and features of the present invention will become clearly apparent from the following specification when considered in connection with the accompanying drawings forming a part thereof.

In the drawings,

Figure 1 is a fragmentary, side elevational view of a typical farm tractor construtcion showing one specific form of the improved braking mechanism mounted thereon.

Figure 2 is a fragmentary, front elevational view of the construction with parts broken away and parts in section showing the brake actuating mechanism.

Figure 3 is a sectional view taken along the line 3—3 of Figure 2 showing the left-hand side of the selector case in elevation.

Figure 4 is an enlarged, vertical sectional view taken along the line 4—4 of Figure 1 looking in the direction of the arrows.

Figure 5 is a transverse, sectional view taken along the line 5—5 of Figure 4 illustrating the manner in which the cams function to operate the latch mechanism.

Figure 6 is an elevational view of one of the selector cams.

It will be readily understood and appreciated that the specific form of the invention shown in the drawings is merely illustrative of one parular embodiment of the invention and that very substantial modifications thereof may be made without departing from the spirit of the invention.

With reference to the specific form of the invention disclosed in the drawings, it will be seen that the apparatus comprises a relatively foolproof and simple arrangement of latches and levers which automatically serves to render the braking system adaptable for operation under a variety of operating conditions, and yet at the same time employing only a single brake pedal.

As seen in Figure 1, a conventional brake pedal 10 is mounted for pivotal movement about a pivot pin 11, this pedal including the usual pad 12 extending through a suitable opening in the floor partition 13. The pivot pin may, as is conventional in constructions of this kind, be anchored in the motor or transmission housing.

The pedal 10 has a portion 14 thereof projecting beyond the pivot pin 11, to which portion is connected a turnbuckle or adjustable link 15 which operatively connects the pedal with a crank arm 16 which functions in the manner hereinafter described in detail.

The selector case generally designated as 20 is simply a housing for enclosing the selective latching mechanism, hereinafter described in detail, and this case is preferably anchored rigidly to the right-hand side of the transmission housing of the tractor by means of bolts or cap screws 21. These cap screws extend through bosses 19 integrally formed on the selector case 20. The normally open side of the housing 20 is closed by means of a cover plate 22 which is secured in place by means of cap screws 23.

The cover plate 22 has a boss 24 formed therein which serves to provide means for mounting a bushing or bearing 25 which serves to provide means for journalling a brake actuating shaft 26. This construction is best seen in Figure 4 of the drawings. On the inner end of the shaft 26 a radially extending crank or lever arm 27 is secured by welding or other suitable means. At the outer end of the shaft 26 a brake rod actuating lever 28 is secured by means of a taper pin 29. As is conventional in constructions of this general character, a brake actuating rod 30 may be pivotally connected to the lever 28 by means of a pin 31 and, as is seen in Figure 1 of the drawings, this rod extends rearwardly to a conventional brake structure (not shown) associated with the right rear wheel of the tractor.

Axially aligned with the boss 24 in the cover plate 22 is a boss 35 formed integrally in the housing 20 which serves to provide means for mounting a bushing 36 serving to journal a brake shaft 37 which, as hereinafter seen, serves to actuate the conventional brake assembly associated with the left rear wheel of the tractor. The boss 35 serves also to provide means for mounting the inner end of a housing tube 38 surrounding the brake actuating shaft 37. As is best seen in Figure 2 of the drawings, the outer end of the housing tube may conveniently be supported by a bracket 39 suitably secured to the transmission housing of the tractor. The outer end of the housing tube 38 has fitted therein a bearing bushing 45 which provides further means for rotatably supporting the shaft 37 and, similar to the shaft 26, the shaft 37 has a brake actuating crank 46 secured thereto by means of a conventional taper pin 47. This brake actuating crank has a brake rod 48 secured thereto which in conventional manner serves to actuate the brake associated with the left rear wheel of the tractor.

At the inner end of the shaft 37 is a radially extending crank arm 50 substantially identical to the radially extending crank arm 27 associated with the shaft 26 and described above.

In the outer ends of the lever arms 27 and 50, shoulder rivets 55 and 56 serve to provide means for pivotally mounting latch members 57 and 58, respectively. The shape and construction of the latch member 58 is clearly shown in Figure 5 of the drawings and it will be understood that latch member 57 is identical in shape, construction, and function therewith except for the fact that it is pivotally mounted on the crank 27, while the latch arm 58 is mounted on crank arm 50.

The crank arm 16 which, as described above, is actuated by the brake pedal 10, is anchored to a shaft 60 journalled for partial rotation in suitable bushings carried by appropriate bosses in the housing 20. One of these bushings 61 and the manner in which it serves to mount the shaft 60 is clearly seen in Figure 2 of the drawings. It is seen that this shaft 60 is positioned against axial movement by means of washer 62 and nut 63. Locked to the shaft 60 is a rocker crank 65 which includes a pair of radially extending arms 66 which arms have axially aligned openings near their outer ends. These arms 66 are spaced apart sufficiently so that there is ample room for the latch members 57 and 58 to move between them and their outer ends are interconnected by a pin 67 passing through the aligned apertures above described.

As is best seen in Figure 5 of the drawings, one end of the latch member 58 is provided with a hook-shaped recess 70 adapted to engage the pin 67 when the shaft 60 is rotated in a clockwise direction as viewed in Figure 5. It is apparent from the foregoing description that such rotation of the shaft 60 will be caused by depressing the brake pedal 10. It is, therefore, seen that depressing the brake pedal 10 causes rotation of the shaft 60 causing arcuate movement of the pin 67 causing this pin to engage the hook-shaped recess 70 in the latch member 58 and normally simultaneously engaging the corresponding recess in the latch member 57 thereby causing simultaneous rotational movement of the brake actuator shafts 26 and 37. In this way, the apparatus functions to simultaneously apply the brakes to both rear wheels when the selector mechanism hereinafter described is not operated.

In order to insure proper engagement of the latch members 57 and 58 with the pin 67, the housing 20 is provided with a small aperture 75 which may be closed by a sheet metal cover plate 76 secured in position by means of screws 77. This cover plate 76 has a pair of spring fingers 78 secured to the inner face thereof and projecting into the housing, one of these spring fingers serving to bear against the latch member 57 and the other serving to bear against the latch member 58 as shown in Figure 5.

In order to operate the brakes selectively when it is desired to make a sharp turn where the inside wheel is to be braked while the outer wheel is free to turn, a selector cam is provided. This selector cam generally designated 80 is shown in Figure 6. The selector cam is journalled for rotary movement in the housing 20. As is seen, it has a pair of cam slots 81 and 82 formed therein. The cam slot 82 is adapted to engage a projection 83 formed on the latch member 58 and the cam slot 81 is adapted to engage a corresponding projection formed on the latch member 57. The outer end of this selector cam shaft has a crank arm 84 secured thereto which is connected by means of a tie rod 85 to the steering arm 86 of the tractor as shown in Figure 1.

The arrangement of the cam slots and the movement of the linkage just described is preferably constructed and arranged so that when the front steering wheels are formed a predetermined amount to the right this will cause a rotation of the selector cam 80 sufficient to cause disengagement of the latch 58 with the pin 67. Therefore, when the brake pedal is depressed, the latch 57 alone will engage the pin 67, thereby applying the braking force solely to the right-hand wheel. Likewise, when the front wheels are steered to the left, the latch 57 will similarly be disengaged while the latch 58 transmits the entire braking to the left wheel when the pedal is depressed.

This construction and arrangement of parts provides simple mechanical means which are substantially automatic to enable the tractor to be turned completely around in a short space requiring but a single brake pedal. It is, of course, a matter of choice or design to arrange the extent to which the steering arm must move to render one or the other of the brakes inoperative and this may conveniently be altered if desired by changing the form or position of the cam slots 81 and 82 or by varying the arrangement of the linkage connecting the selector cam with the steering arm.

As mentioned above, circumstances may make it desirable to selectively apply the brakes when it is desired to retain the steering wheels in substantially the straight-away position. This is accomplished by means of a second selector cam 90 similar in all material respects to the selector cam 80 shown in Figure 6. This cam has a pair of cam slots therein, one of these 91 being adapted to receive the extreme end of the latch 58 and the other correspondingly receiving the latch 57. This selector cam 90 is rotated by means of a crank 92 to which is connected an operating rod 93 reciprocated by a manually operated control handle 94.

A torsion spring 95 surrounds the projecting end of the selector cam 90 outside the housing 20. The free ends of this spring engage a pin 96 carried by the housing 20 and also a pin 97 carried in the side face of the crank 92. This spring, therefore, serves to retain the cam in neutral position unless actually held on one or the other of its shifted positions by the operator.

From the foregoing, it will be clear that if muddy, slippery, or other road conditions require selective braking of the wheels, this can easily and effectively be accomplished by manual movement of the operating handle 94.

It will be readily understood that the single form of the invention shown in the drawings and described above is merely one very specific embodiment of the invention herein disclosed and that many modifications may be made therein falling within the scope of the invention as set forth in the following claims.

What is claimed is:

1. In a brake system for tractors having a steering mechanism, a brake pedal, a pair of brake actuating members, one connected to each of the main drive wheels of said tractor, a latch mechanism for operatively connecting each of said brake actuating members with said pedal, means connected with and actuated by the steering mechanism of said tractor for causing selective connections of said latch mechanisms with the brake pedal and manually operated means also serving to effect selective release or engagement of said latch mechanism from said brake pedal.

2. A brake system for tractors having a steering mechanism including in combination a single brake pedal and a pair of brake actuating members, one for actuating a brake on one side of said tractor and the other for actuating a brake on the opposite side thereof, a latch mechanism associated with each of said brake actuating members serving to releasably interconnect the same with said pedal, and means associated with the steering mechanism of said tractor serving to disengage one of said latch mechanisms from its connection with the brake pedal when the steering mechanism is turned in one direction and to disengage the other of said latch mechanisms when the steering mechanism is turned in the opposite direction.

3. A brake system for tractors having a steering mechanism including in combination a single brake pedal and a pair of brake actuating members, one for actuating a brake on one side of said tractor and the other for actuating a brake on the opposite side of said tractor, a latch mechanism associated with each of said brake actuating members serving to releasably interconnect the same with said pedal, means associated with the steering mechanism of said tractor serving to disengage one of said latch mechanisms from its connection with the brake pedal when the steering wheel is turned in one direction and to disengage the other when the steering wheel is turned in the opposite direction, and manually operated means independent of said last mentioned means also serving to effect selective engagement of said latch mechanisms with said brake pedal.

4. A brake system for tractors having a steering mechanism including in combination a single pedal and a pair of independently operable brake actuating members adapted for actuation by said pedal, one of said brake actuating mechanisms serving to actuate a brake at one side of said tractor and the other at the other side thereof, a latch mechanism associated with each brake actuating member for releasably interconnecting the same with said pedal, a selector cam adapted to engage both of said latch mechanisms for selective release of one or the other of said latch mechanisms, and means associated with the steering mechanism of said tractor for operating said selector cam.

DENT PARRETT.

REFERENCES CITED

The following references are of record in the file of this patent:

UNITED STATES PATENTS

| Number | Name | Date |
| --- | --- | --- |
| 2,261,398 | Milster | Nov. 4, 1941 |
| 2,264,537 | Lambert et al. | Dec. 2, 1941 |
| 1,224,826 | Wiser | May 1, 1917 |
| 1,736,082 | Houseman | Nov. 19, 1929 |
| 2,346,175 | Matson | Apr. 11, 1944 |